(12) United States Patent
Clark et al.

(10) Patent No.: US 8,639,861 B1
(45) Date of Patent: Jan. 28, 2014

(54) PSEUDO WRITING SYSTEM AND METHOD

(75) Inventors: Roy E. Clark, Hopkinton, MA (US);
Kenneth J. Taylor, Franklin, MA (US);
Robert P. Ng, Millbrae, CA (US); Yaron Dar, Sudbury, MA (US)

(73) Assignee: EMC Corporation, Hopkinton, MA (US)

( * ) Notice: Subject to any disclaimer, the term of this patent is extended or adjusted under 35 U.S.C. 154(b) by 273 days.

(21) Appl. No.: 13/077,873

(22) Filed: Mar. 31, 2011

(51) Int. Cl.
*G06F 3/00* (2006.01)

(52) U.S. Cl.
USPC ............ 710/39; 710/30; 709/217; 709/218; 709/219; 709/230; 711/100; 711/111; 711/112; 711/114

(58) Field of Classification Search
None
See application file for complete search history.

(56) References Cited

U.S. PATENT DOCUMENTS

| | | | | |
|---|---|---|---|---|
| 6,434,639 B1 * | 8/2002 | Haghighi | ................ | 710/39 |
| 6,931,501 B1 * | 8/2005 | Narayanaswamy et al. | .. | 711/158 |
| 8,468,319 B1 * | 6/2013 | Satran | .......... | 711/168 |
| 2004/0133607 A1 * | 7/2004 | Miloushev et al. | ........... | 707/200 |
| 2004/0268019 A1 * | 12/2004 | Kobayashi et al. | ............... | 711/1 |
| 2006/0004839 A1 * | 1/2006 | Nagasawa et al. | ............. | 707/102 |
| 2006/0080353 A1 * | 4/2006 | Miloushev et al. | ............. | 707/102 |
| 2007/0079044 A1 * | 4/2007 | Mandal et al. | ................ | 710/310 |
| 2007/0266053 A1 * | 11/2007 | Ahal et al. | .................... | 707/200 |
| 2008/0120463 A1 * | 5/2008 | Ashmore | ...................... | 711/114 |
| 2008/0126374 A1 * | 5/2008 | Borthakur et al. | ............ | 707/100 |
| 2009/0240705 A1 * | 9/2009 | Miloushev et al. | ............. | 707/10 |
| 2009/0292861 A1 * | 11/2009 | Kanevsky et al. | ............ | 711/103 |
| 2010/0106955 A1 * | 4/2010 | Odell | ............................... | 713/2 |
| 2011/0289261 A1 * | 11/2011 | Candelaria | .................... | 711/103 |

FOREIGN PATENT DOCUMENTS

JP 2010079536 A * 4/2010

OTHER PUBLICATIONS

"HP Smart Array controller technology" Technology Brief, Copyright 2010 Hewlett-Packard Development Company, L.P.*

* cited by examiner

*Primary Examiner* — Steven Snyder
(74) *Attorney, Agent, or Firm* — Brian J. Colandreo; Mark H. Whittenberger; Holland & Knight LLP

(57) ABSTRACT

A method, computer program product, and computing system for combining a plurality of discrete IO write requests to form a combined IO write request, wherein the plurality of IO write requests define data to be written to a storage network. The combined IO write request is provided to a pseudo multi-write device included within the storage network.

21 Claims, 3 Drawing Sheets

PSEUDO WRITING SYSTEM AND METHOD

TECHNICAL FIELD

This disclosure relates to writing systems and, more particularly, to pseudo writing devices for use in a storage network.

BACKGROUND

A database system, file system, page cache, virtual machine monitor, write-back server flash cache, etc. typically include one or more buffer writer processes. The function of a buffer writer process is to write data from a buffer cache into the backend storage system of a storage network in order to free up buffer space.

The buffer writer may scan the content of the buffer cache to gather candidate memory blocks for writing to the backend storage system. Typically, the buffer writer will attempt to merge appropriate memory blocks to reduces the number of write operations performed on the backend storage system. However, most memory blocks end up being unmergable, thus unfortunately results in a stream of single block random writes operations being performed on the storage network.

SUMMARY OF DISCLOSURE

In a first implementation, a method includes combining a plurality of discrete IO write requests to form a combined IO write request, wherein the plurality of IO write requests define data to be written to a storage network. The combined IO write request is provided to a pseudo multi-write device included within the storage network.

One or more of the following features may be included. The combined IO write request may be disassembled, on the pseudo multi-write device, to reconstitute the plurality of discrete IO write requests. The plurality of discrete IO write requests may be processed on the pseudo multi-write device. The pseudo multi-write device may include a plurality of discrete storage devices. The plurality of discrete IO write requests may be received on a storage processor included within the storage network, and combining the plurality of discrete IO write requests to form a combined IO write request may occur on the storage processor. Combining the plurality of discrete IO write requests to form a combined IO write request may occur on a remote computing device. The storage network may include a plurality of storage devices.

In another implementation, a computer program product resides on a computer readable medium and has a plurality of instructions stored on it. When executed by a processor, the instructions cause the processor to perform operations including combining a plurality of discrete IO write requests to form a combined IO write request, wherein the plurality of IO write requests define data to be written to a storage network. The combined IO write request is provided to a pseudo multi-write device included within the storage network.

One or more of the following features may be included. The combined IO write request may be disassembled, on the pseudo multi-write device, to reconstitute the plurality of discrete IO write requests. The plurality of discrete IO write requests may be processed on the pseudo multi-write device. The pseudo multi-write device may include a plurality of discrete storage devices. The plurality of discrete IO write requests may be received on a storage processor included within the storage network, and combining the plurality of discrete IO write requests to form a combined IO write request may occur on the storage processor. Combining the plurality of discrete IO write requests to form a combined IO write request may occur on a remote computing device. The storage network may include a plurality of storage devices.

In another implementation, a computing system includes at least one processor and at least one memory architecture coupled with the at least one processor.

A first software module is executed on the at least one processor and the at least one memory architecture. The first software module is configured to perform operations including combining a plurality of discrete IO write requests to form a combined IO write request, wherein the plurality of IO write requests define data to be written to a storage network.

A second software module is executed on the at least one processor and the at least one memory architecture. The second software module is configured to perform operations including providing the combined IO write request to a pseudo multi-write device included within the storage network.

One or more of the following features may be included. The combined IO write request may be disassembled, on the pseudo multi-write device, to reconstitute the plurality of discrete IO write requests. The plurality of discrete IO write requests may be processed on the pseudo multi-write device. The pseudo multi-write device may include a plurality of discrete storage devices. The plurality of discrete IO write requests may be received on a storage processor included within the storage network, and combining the plurality of discrete IO write requests to form a combined IO write request may occur on the storage processor. Combining the plurality of discrete IO write requests to form a combined IO write request may occur on a remote computing device. The storage network may include a plurality of storage devices.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
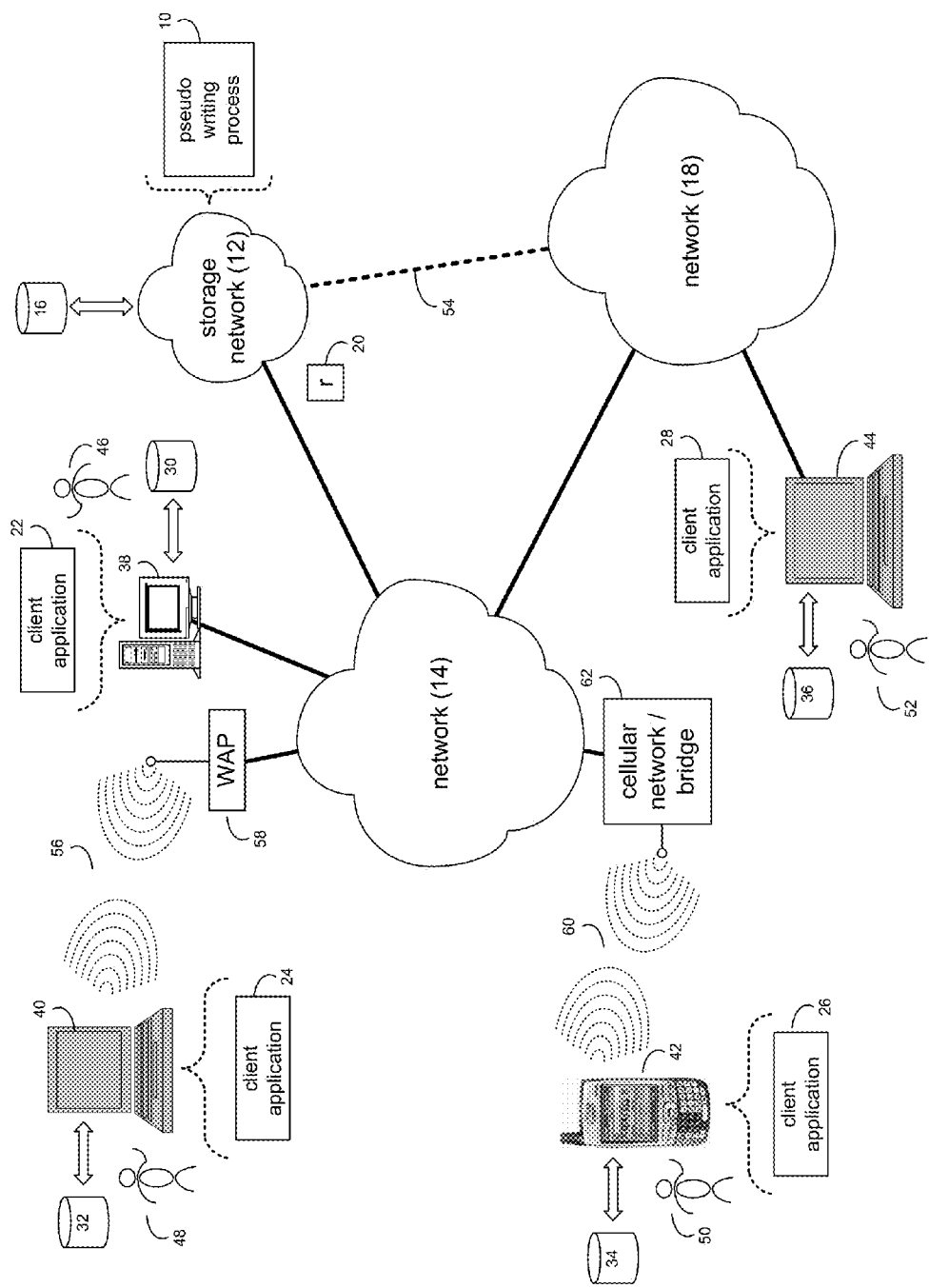
FIG. 1 is a diagrammatic view of a storage network and a pseudo writing process coupled to a distributed computing network.

System Overview:

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Referring to FIG. 1, there is shown pseudo writing process 10 that may reside on and may be executed by storage network 12, which may be connected to network 14 (e.g., the Internet or a local area network). Examples of storage network 12 may include, but are not limited to: a Network Attached Storage (NAS) system and a Storage Area Network (SAN). As will be discussed below in greater detail, a SAN may include one or more of a personal computer, a server computer, a series of server computers, a mini computer, a mainframe computer, a RAID array and an NAS. The various components of storage network 12 may execute one or more operating systems, examples of which may include but are not limited to: Microsoft Windows XP Server™; Novell Netware™; Redhat Linux™, Unix, or a custom operating system, for example.

As will be discussed below in greater detail, pseudo writing process 10 may combine a plurality of discrete IO write requests to form a combined IO write request, wherein the plurality of IO write requests define data to be written to storage network 12. Pseudo writing process 10 may provide the combined IO write request to a pseudo multi-write device included within storage network 12.

The instruction sets and subroutines of pseudo writing process 10, which may be stored on storage device 16 included within storage network 12, may be executed by one or more processors (not shown) and one or more memory architectures (not shown) included within storage network 12. Storage device 16 may include but is not limited to: a hard disk drive; a tape drive; an optical drive; a RAID array; a random access memory (RAM); a read-only memory (ROM); and flash memory.

Network 14 may be connected to one or more secondary networks (e.g., network 18), examples of which may include but are not limited to: a local area network; a wide area network; or an intranet, for example.

Various data requests (e.g. data request 20) may be sent from client applications 22, 24, 26, 28 to storage network 12. Examples of data request 20 may include but are not limited to data write requests (i.e. a request that a data segment be written to storage network 12) and data read requests (i.e. a request that a data segment be read from storage network 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID arrays; random access memories (RAM); read-only memories (ROM), and all forms of flash memory storage devices. Examples of client electronic devices 38, 40, 42, 44 may include, but are not limited to, personal computer 38, laptop computer 40, personal digital assistant 42, notebook computer 44, a server (not shown), a data-enabled, cellular telephone (not shown), and a dedicated network device (not shown).

Users 46, 48, 50, 52 may access storage network 12 directly through network 14 or through secondary network 18. Further, storage network 12 may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth device that is capable of establishing wireless communication channel 56 between laptop computer 40 and WAP 58. Personal digital assistant 42 is shown wirelessly coupled to network 14 via wireless communication channel 60 established between personal digital assistant 42 and cellular network/ bridge 62, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows™, Microsoft Windows CE™, Redhat Linux™, or a custom operating system.

Figure 2:
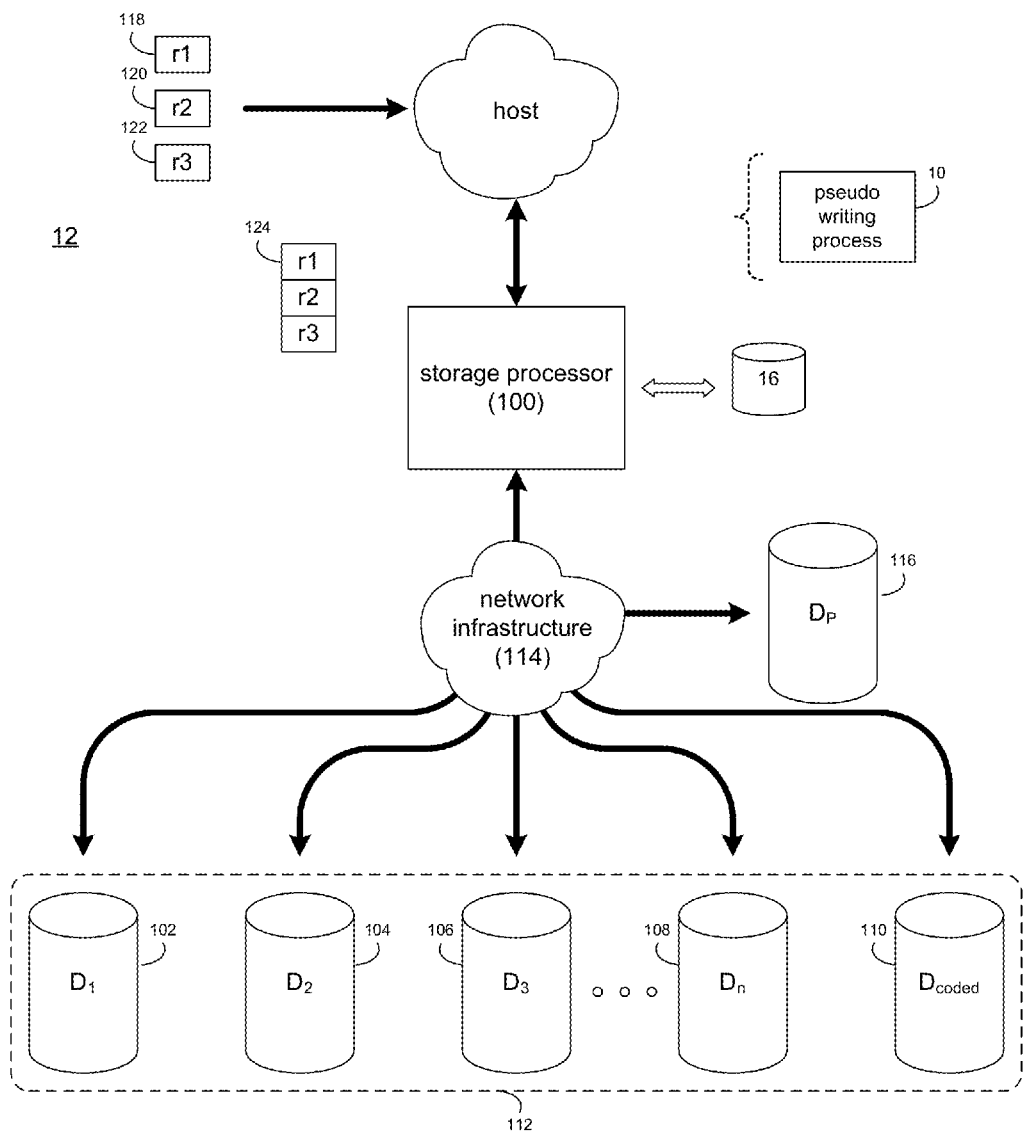
FIG. 2 is a diagrammatic view of the storage network of FIG. 1.

Referring also to FIG. 2, storage network 12 may include at least one storage processor (e.g. storage processor 100), examples of which may include but are not limited the types of storage processors included within the CLARiiON series arrays offered by The EMC Corporation of Hopkinton, Mass. While storage network 12 is shown to include a single storage processor (i.e. storage processor 100), this is for illustrative purposes only and is not intended to be a limitation of this disclosure, as other configurations are possible and are considered to be within the scope of this disclosure. For example, storage network 12 may be configured in a high availability fashion and one or more additional storage processors storage processors (not shown) may be included within storage network 12. In the event that storage network 12 includes a plurality of storage processors, each storage processor may be configured as a hot-swappable field replaceable unit (FRU).

Storage processor 100 may be configured to allow for front-end connectivity to "hosts". Examples of such "hosts" may include but are not limited to the various computers, servers, and client electronic devices that are connected to e.g. networks 14, 18. A specific example of a "host" is a computer (e.g., computer 38) that is executing a database application in which the database application is configured to store the database information on storage network 12. Additionally, storage processor 100 may be configured to allow for back-end connectivity to various disk arrays, which will be discussed below in greater detail.

The storage processors (e.g. storage processor 100) included within storage network 12 may include cache memory (not shown) that may be segmented into read cache memory (not shown) and write cache memory (not shown). Read cache memory may be used for staging/prefetching data for filling data read requests received from a host and write cache memory may be used to accelerate data write request received from a host.

Storage network 12 may further include a plurality of storage devices $D_{1-n}$ (e.g. storage devices 102, 104, 106, 108). Storage devices 102, 104, 106, 108 may be configured to provide various levels of performance and/or high availability. For example, one or more of storage devices 102, 104, 106, 108 may be configured as a RAID 0 array, in which data is striped across storage devices. By striping data across a plurality of storage devices, improved performance may be realized. However, RAID 0 arrays do not provide a level of high availability. Additionally/alternatively, one or more of storage devices 102, 104, 106, 108 may be configured as a RAID 1 array, in which data is mirrored between storage devices. By mirroring data between storage devices, a level of high availability is achieved as multiple copies of the data are stored within storage network 12.

While in this particular example, storage network 12 is shown to include four storage devices (e.g. storage devices 102, 104, 106, 108), this is for illustrative purposes only and is not intended to be a limitation of this disclosure. Specifically, the actual number of storage devices may be increased or decreased depending upon e.g. the level of redundancy/ performance/capacity required.

Storage network 12 may also include one or more coded targets 110. As is known in the art, a coded target may be used to store coded data that may allow for the regeneration of data lost/corrupted on one or more of storage devices 102, 104, 106, 108. An example of such a coded target may include but is not limited to a hard disk drive that is used to store parity data within a RAID array.

While in this particular example, storage network 12 is shown to include one coded target (e.g., coded target 110), this is for illustrative purposes only and is not intended to be a limitation of this disclosure. Specifically, the actual number of coded targets may be increased or decreased depending upon e.g. the level of redundancy/performance/capacity required.

A combination of storage devices 102, 104, 106, 108 and coded target 110 may form non-volatile, memory system 112. Examples of storage devices 102, 104, 106, 108 and coded target 110 included within non-volatile, memory system 112 may include but are not limited to a plurality of electromechanical hard disk drives and/or a plurality of solid-state flash disk drives.

Storage network 12 may also include one or more pseudo multi-write devices (e.g., pseudo multi-write device 116), which may act at temporary staging area for the above-referenced combined IO write requests. While in this particular example, storage network 12 is shown to include only one pseudo multi-write device (e.g., pseudo multi-write devices 116), this is for illustrative purposes only and is not intended to be a limitation of this disclosure. Specifically, the actual number of pseudo multi-write devices may be increased or decreased depending upon e.g. the level of performance/capacity required.

Pseudo multi-write device 116 may include a plurality of discrete storage devices (not shown), examples of which may include but are not limited to a plurality of electromechanical hard disk drives and/or a plurality of solid-state flash disk drives.

The manner in which storage network 12 is implemented may vary depending upon e.g. the level of redundancy/performance/capacity required. For example, storage network 12 may be a RAID device in which storage processor 100 is a RAID controller card and storage devices 102, 104, 106, 108 and/or coded target 110 are individual "hot-swappable" hard disk drives. An example of such a RAID device may include but is not limited to an NAS device. Alternatively, storage network 12 may be configured as a SAN, in which storage processor 100 may be a dedicated device (e.g., a CLARiiON storage processor) and each of storage devices 102, 104, 106, 108 and/or coded target 110 may be a RAID device.

The various components of storage network 12 (e.g. storage processor 100, storage devices 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage processor 100 may execute all or a portion of pseudo writing process 10. Additionally, one or more of storage devices 102, 104, 106, 108 and/or coded target 110 may execute all or a portion of pseudo writing process 10. Further, pseudo multi-write device 116 may execute all or a portion of pseudo writing process 10. Further still, one or more of the "hosts" (e.g., client electronic devices 38, 40, 42, 44) may execute all or a portion of pseudo writing process 10. For example, pseudo writing process 10 may be a multi-component process that includes e.g., a storage-processor-based component (not shown), a target-based component (not shown), a pseudo-multi-write-device-based component (not shown), and a client-electronic-device component (not shown).

For example and for illustrative purposes, the storage-processor-based component of pseudo writing process 10 may be executed on storage processor 100. Further and for illustrative purposes, the target-based component of pseudo writing process 10 may be executed on each of storage devices 102, 104, 106, 108 and/or coded target 110. Additionally and for illustrative purposes, the pseudo-multi-write-device-based component of pseudo writing process 10 may be executed on pseudo multi-write device 116. Further and for illustrative purposes, the client-electronic-device component of pseudo writing process 10 may be executed on one or more of the "hosts" (e.g., client electronic devices 38, 40, 42, 44).

Accordingly, the storage-processor-based component of pseudo writing process 10, the target-based component(s) of pseudo writing process 10, the client-electronic-device component of pseudo writing process 10, and the pseudo-multi-write-device-based component of pseudo writing process 10 may cooperatively operate to effectuate all of the functionality of pseudo writing process 10.

The instruction sets and subroutines of the storage-processor-based component of pseudo writing process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); and a read-only memory (ROM).

The instruction sets and subroutines of the target-based component(s) of pseudo writing process 10, which may be stored on a storage device (not shown) coupled to e.g., each of storage devices 102, 104, 106, 108 and/or coded target 110 may be executed by one or more processors (not shown) and one or more memory architectures (not shown) included within each of storage devices 102, 104, 106, 108 and/or coded target 110. The storage device (not shown) may include but is not limited to: a hard disk drive; a tape drive; an optical drive; a RAID device; a random access memory (RAM); and a read-only memory (ROM).

The instruction sets and subroutines of the pseudo-multi-write-device-based component of pseudo writing process 10, which may be stored on a storage device (not shown) coupled to pseudo multi-write device 116 may be executed by one or more processors (not shown) and one or more memory architectures (not shown) included within pseudo multi-write device 116. The storage device (not shown) may include but is not limited to: a hard disk drive; a tape drive; an optical drive; a RAID device; a random access memory (RAM); and a read-only memory (ROM).

The instruction sets and subroutines of the client-electronic-device component of pseudo writing process 10, which may be stored on a storage device coupled to the client electronic device, may be executed by one or more processors (not shown) and one or more memory architectures (not shown) included within the client electronic device. The storage device coupled to the client electronic device may include but is not limited to: a hard disk drive; a tape drive; an optical drive; a RAID device; a random access memory (RAM); and a read-only memory (ROM).

Figure 3:
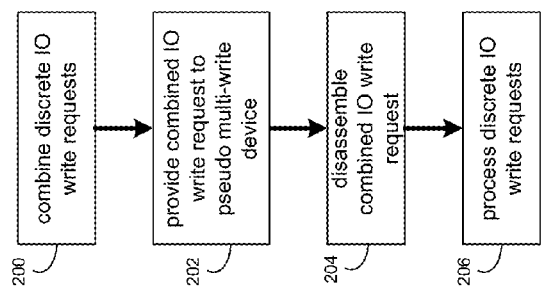
FIG. 3 is a flowchart of the pseudo writing process of FIG. 1.

The Pseudo Writing Process:

Referring also to FIG. 3 and as discussed above, pseudo writing process 10 may combine 200 a plurality of discrete IO write requests (e.g., discrete IO write requests 118, 120, 122) to form a combined IO write request (e.g., combined IO write request 124), wherein the plurality of IO write requests (e.g., discrete IO write requests 118, 120, 122) define data to be written to storage network 12. Discrete IO write requests 118, 120, 122 may be generated as a result of the device that produced such write requests freeing up space within their cache memory by writing various portions of the data within the cache memory to e.g., storage network 12.

Pseudo writing process 10 may provide 202 the combined IO write request (e.g., combined IO write request 124) to a pseudo multi-write device (e.g., pseudo multi-write device 116) included within storage network 12.

As discussed above, all or a portion of pseudo writing process 10 may be executed by storage processor 100, storage devices 102, 104, 106, 108 and/or coded target 110, pseudo multi-write device 116, and/or one or more of the "hosts" (e.g., client electronic devices 38, 40, 42, 44). Accordingly, the storage-processor-based component of pseudo writing process 10, the target-based component(s) of pseudo writing process 10, the client-electronic-device component of pseudo writing process 10, and the pseudo-multi-write-device-based component of pseudo writing process 10 may cooperatively operate to effectuate all of the functionality of pseudo writing process 10.

Therefore and depending upon the manner in which pseudo writing process 10 is configured, the process of combining 200 a plurality of discrete IO write requests (e.g., discrete IO write requests 118, 120, 122) to form a combined IO write request (e.g., combined IO write request 124) may occur in one of a couple different locations.

For example, discrete IO write requests 118, 120, 122 may be combined 200 by one or the "hosts" (e.g., client electronic devices 38, 40, 42, 44). For example, assume that the "host" is computer 38 that is executing a database application in which the database application is configured to store the database information on storage network 12. Accordingly, the portion of pseudo writing process 10 being executed on computer 38 may gather discrete IO write requests 118, 120, 122 and combine 200 them to form combined IO write request 124.

Alternatively, discrete IO write requests 118, 120, 122 may be combined 200 by storage processor 100. Continuing with the example in which computer 38 is executing a database application in which the database application is configured to store the database information on storage network 12, assume that instead of combining discrete IO write requests 118, 120, 122, computer 38 merely passes discrete IO write requests 118, 120, 122 in their native form to storage processor 10. Accordingly, storage processor 10 may gather discrete IO write requests 118, 120, 122 and combine 200 them to form combined IO write request 124.

As discussed above, once formed, pseudo writing process 10 may provide 202 combined IO write request 124 to pseudo multi-write device 116 included within storage network 12. Upon receiving the same, the portion of pseudo writing process 10 being executed on pseudo multi-write device 116 may be disassemble 204 combined IO write request 124 to reconstitute the plurality of discrete IO write requests included therein, namely discrete IO write requests 118, 120, 122.

Further, the portion of pseudo writing process 10 being executed on pseudo multi-write device 116 may process 206 discrete IO write requests 118, 120, 122 and, therefore, write the appropriate pieces of data to the appropriate storage devices/units included within storage network 12. Depending on the matter in which pseudo writing process 10 is configured, pseudo writing process 10 may immediately process 206 discrete IO write requests 118, 120, 122 or may process 206 discrete IO write requests 118, 120, 122 some time in the future.

Regardless of the urgency at which pseudo writing process IO writes the data associated with discrete IO write requests 118, 120, 122 to storage network 12, care must be taken to ensure that any subsequent read requests for the data associated with discrete IO write requests 118, 120, 122 results in the appropriate piece of data being provided to the requester. For example, in the event that a read request comes in for the data associated with IO write request 118 prior to such data being written to storage network 12, pseudo writing process 10 should take care to provide the up-to-date data (which is currently stored on pseudo multi-write device 116) to the requester as opposed to providing the out-of-date data that is currently stored on storage network 12.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

What is claimed is:

1. A method comprising:
combining a plurality of discrete input/output (IO) write requests to form a combined IO write request, wherein the plurality of IO write requests define data to be written to a storage network;
providing the combined IO write request to a pseudo multi-write device included within the storage network;
writing a first portion of the data to a first storage device and a second portion of the data to a second storage device, wherein the first and second storage devices are included within the storage network; and
responsive to a received IO read request, if the first portion of the data has not yet been written to the first storage device, providing the first portion of the data from the pseudo multi-write device.

2. The method of claim 1 further comprising:
disassembling the combined IO write request, on the pseudo multi-write device, to reconstitute the plurality of discrete IO write requests.

3. The method of claim 2 further comprising:
processing the plurality of discrete IO write requests on the pseudo multi-write device.

4. The method of claim 1 wherein the pseudo multi-write device includes a plurality of discrete storage devices.

5. The method of claim 1 wherein the plurality of discrete IO write requests are received on a storage processor included within the storage network, and combining the plurality of discrete IO write requests to form a combined IO write request occurs on the storage processor.

6. The method of claim 1 wherein combining the plurality of discrete IO write requests to form a combined IO write request occurs on a host.

7. The method of claim 1 wherein the storage network includes a plurality of storage devices.

8. A computer program product residing on a non-transitory computer readable medium having a plurality of instructions stored thereon which, when executed by a processor, cause the processor to perform operations comprising:
   combining a plurality of discrete input/output (IO) write requests to form a combined IO write request, wherein the plurality of IO write requests define data to be written to a storage network;
   providing the combined IO write request to a pseudo multi-write device included within the storage network;
   writing a first portion of the data to a first storage device and a second portion of the data to a second storage device, wherein the first and second storage devices are included within the storage network; and
   responsive to a received IO read request, if the first portion of the data has not yet been written to the first storage device, providing the first portion of the data from the pseudo multi-write device.

9. The computer program product of claim 8 further comprising instructions for:
   disassembling the combined IO write request, on the pseudo multi-write device, to reconstitute the plurality of discrete IO write requests.

10. The computer program product of claim 9 further comprising instructions for:
    processing the plurality of discrete IO write requests on the pseudo multi-write device.

11. The computer program product of claim 8 wherein the pseudo multi-write device includes a plurality of discrete storage devices.

12. The computer program product of claim 8 wherein the plurality of discrete IO write requests are received on a storage processor included within the storage network, and combining the plurality of discrete IO write requests to form a combined IO write request occurs on the storage processor.

13. The computer program product of claim 8 wherein combining the plurality of discrete IO write requests to form a combined IO write request occurs on a host.

14. The computer program product of claim 8 wherein the storage network includes a plurality of storage devices.

15. A computing system comprising:
    at least one processor;
    at least one memory architecture coupled with the at least one processor;
    a first software module executed on the at least one processor and the at least one memory architecture, wherein the first software module is configured to perform operations including combining a plurality of discrete input/output (IO) write requests to form a combined IO write request, wherein the plurality of IO write requests define data to be written to a storage network;
    a second software module executed on the at least one processor and the at least one memory architecture, wherein the second software module is configured to perform operations including providing the combined IO write request to a pseudo multi-write device included within the storage network;
    a third software module executed on the at least one processor and the at least one memory architecture, wherein the third software module is configured to write a first portion of the data to a first storage device and a second portion of the data to a second storage device, wherein the first and second storage devices are included within the storage network; and
    a fourth software module executed on the at least one processor and the at least one memory architecture, wherein the fourth software module is configured to provide, responsive to a received IO read request, the first portion of the data from the pseudo multi-write device if the first portion of the data has not yet been written to the first storage device.

16. The computing system of claim 15 further comprising a third software module executed on the at least one processor and the at least one memory architecture, wherein the third software module is configured to perform operations including:
    disassembling the combined IO write request, on the pseudo multi-write device, to reconstitute the plurality of discrete IO write requests.

17. The computing system of claim 16 further comprising a fourth software module executed on the at least one processor and the at least one memory architecture, wherein the fourth software module is configured to perform operations including:
    processing the plurality of discrete IO write requests on the pseudo multi-write device.

18. The computing system of claim 15 wherein the pseudo multi-write device includes a plurality of discrete storage devices.

19. The computing system of claim 15 wherein the plurality of discrete IO write requests are received on a storage processor included within the storage network, and combining the plurality of discrete IO write requests to form a combined IO write request occurs on the storage processor.

20. The computing system of claim 15 wherein combining the plurality of discrete IO write requests to form a combined IO write request occurs on a host.

21. The computing system of claim 15 wherein the storage network includes a plurality of storage devices.

* * * * *